(12) United States Patent
Nakajima

(10) Patent No.: US 6,522,611 B2
(45) Date of Patent: Feb. 18, 2003

(54) METHOD AND APPARATUS FOR READING AND WRITING INFORMATION, AND INFORMATION STORAGE MEDIUM

(75) Inventor: Eiji Nakajima, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/022,358

(22) Filed: Dec. 20, 2001

(65) Prior Publication Data
US 2002/0080701 A1 Jun. 27, 2002

(30) Foreign Application Priority Data
Dec. 21, 2000 (JP) ...................................... 2000-388609

(51) Int. Cl.⁷ ................................................ G11B 3/90
(52) U.S. Cl. ................................ 369/53.22; 369/533.31
(58) Field of Search ........................... 369/44.13, 47.14, 369/53.12, 53.2, 53.22, 53.23, 53.31, 53.37, 53.41, 53.42, 53.44, 53.45, 124.15

(56) References Cited

U.S. PATENT DOCUMENTS 6,144,625 A * 11/2000 Kuroda et al. ........... 369/53.23
6,345,024 B2 * 2/2002 Sugasawa et al. ......... 369/53.2

* cited by examiner

Primary Examiner—Paul W. Huber
(74) Attorney, Agent, or Firm—Arent Fox Kintner Plotkin and Kahn

(57) ABSTRACT

A laser beam reflected on a storage surface of a DVD is detected with a light-receiving device to allow a matrix circuit to generate a push-pull signal. The push-pull signal is converted into a binary signal, and a base-n counter, having an upper-limit count which is set to a certain value, counts the resulting signal. A count circuit $8e$ having a prescribed count time period counts a carry signal which is delivered by the base-n counter. Then, a detection factor is determined from the ratio of the count of the carry signal to the count time period. When the detection factor is below a prescribed value, the upper-limit count of the base-n counter or the count time period is adjusted to control the detection sensitivity. A judgment portion compares a plurality of detection factors with a prescribed threshold to find a determination rate or the ratio of the number of detection factors to be compared with to the number of detection factors which exceed the prescribed threshold. When the determination rate exceeds the prescribed determination threshold, the process determines that wobbles are formed on the information read and/or write media. The determination threshold is adjusted when the determination rate does not exceed the determination threshold.

9 Claims, 11 Drawing Sheets

METHOD AND APPARATUS FOR READING AND WRITING INFORMATION, AND INFORMATION STORAGE MEDIUM

BACKGROUND OF THE INVENTION

The present invention relates to an information read and/or write apparatus and method for detecting wobbles with high accuracy in reading/writing information from/on a wobbled information read and/or write medium such as DVDs, and to an information storage medium on which information for implementing the information read and/or write method is stored.

The present application claims priority from Japanese Application No. 2000-388609, the disclosure of which is incorporated herein by reference for all purposes.

Digital versatile disks or digital video disks (DVDs) have been developed as an information read and/or write medium which enables high-density storage of information. In addition to read-only DVDs such as DVD-Videos or DVD-ROMs, writable. DVDs such as DVD-Rs and rewritable DVDs such as DVD-RWs have also been developed, with which the DVD family has been filled out.

However, for users who use such DVDs of many types, it is inconvenient to buy a purpose-built information read and/or write apparatus for use with each type of the DVDs. Accordingly, it has become more demanding to develop a versatile information read and/or write apparatus which can be used with each of those of the DVD family irrespective of their types.

Even such DVDs which belong to the same DVD family have each a different physical structure for storing information thereon and different physical and logical data structures. Accordingly, to read or write information on a DVD, an information read and/or write apparatus has to first determine whether the DVD is wobbled or non-wobbled so that the information can be read or written properly on the DVD in accordance with the type of the DVD. (The information read and/or write apparatus used herein is a generic name for an information read-only apparatus, an information write-only apparatus, and an apparatus which enables reading and writing information.)

Furthermore, suppose such a DVD having contents stored thereon is detected which are not allowed to be copied. In this case, from the viewpoint of copyright protection, it is necessary to determine the type of the DVD in order to prevent the apparatus from reading information on the DVD having contents illegally copied.

However, there has been a problem of the information read and/or write medium which is caused by variations in manufacturing of the DVD or a curved read and/or write surface. There has also been another problem of the information read and/or write apparatus which is caused by the optical pickup, incorporated in the information read and/or write apparatus, having an individual difference and by the aging of the pickup or by the aging of an electronic component which is incorporated in the signal processing circuit. These problems have made it difficult to determine the presence or absence of wobbles with high accuracy. That is, even when an information read and/or write apparatus has been provided with the optimum factory condition for setting and shipping, it has been difficult to prevent the degradation in accuracy of determining wobbles under an expected environment after the shipping of the information read and/or write apparatus.

SUMMARY OF THE INVENTION

The present invention has been developed in view of these conventional problems. It is therefore an object of the present invention to provide an information read and/or write apparatus and method for enabling a highly accurate determination of the presence or absence of wobbles. It is another object of the present invention to provide an information read and/or write medium having information stored thereon for enabling a highly accurate determination of the presence or absence of wobbles.

According to a first aspect of the invention, there is provided an information read and/or write apparatus having a function for distinguishing between an information read and/or write medium having a wobbled track and an information read and/or write medium having a non-wobbled track, comprising: a light-receiving device for receiving a light beam reflected on said information read and/or write medium; signal generator device for generating a signal characteristic of a read and/or write surface of said information read and/or write medium in accordance with an output signal delivered by said light-receiving device; sensor device for detecting the characteristic information of said read and/or write surface in accordance with the signal delivered by said signal generator device and for determining a detection rate of the characteristic information per a prescribed detection time period; determination device for determining presence or absence of said wobbled track on said information read and/or write medium in accordance with said detection rate; and control device for controlling detection sensitivity to detect said characteristic information by adjusting a detection sensitivity parameter when said determination device has provided a determination in error.

According to a second aspect of the invention, there is provided an information read and/or write apparatus having a function for distinguishing between an information read and/or write medium having a wobbled track and an information read and/or write medium having a non-wobbled track, comprising: a light-receiving device for receiving a light beam reflected on said information read and/or write medium; signal generator device for generating a signal characteristic of a read and/or write surface of said information read and/or write medium in accordance with an output signal delivered by said light-receiving device; sensor device for detecting the characteristic information of said read and/or write surface in accordance with the signal delivered by said signal generator device and for determining a detection rate of the characteristic information per a prescribed detection time period; and determination device for comparing a plurality of detection rates determined by said sensor device with a prescribed threshold to find a determination rate or a ratio of a detection rate count exceeding said threshold to a detection rate count to be compared with and then determine the presence or absence of said wobbled track on the information read and/or write medium in accordance with a determination of whether said determination rate is greater than the prescribed determination threshold, and for adjusting said determination threshold when said determination device has provided a determination in error. In particular, the determination threshold is set at a value for distinguishing between said information read and/or write medium having said wobbled track and said information read and/or write medium having said non-wobbled track.

According to a third aspect of the invention, there is provided an information read and/or write apparatus having a function for distinguishing between an information read and/or write medium having a wobbled track and an information read and/or write medium having a non-wobbled track, comprising: a light-receiving device for receiving a light beam reflected on said information read and/or write medium; signal generator device for generating a signal characteristic of a read and/or write surface of said information read and/or write medium in accordance with an output signal delivered by said light-receiving device; sensor device for detecting the characteristic information of said read and/or write surface in accordance with the signal delivered by said signal generator device and for determining a detection rate of the characteristic information per a prescribed detection time period; determination device for determining presence or absence of wobbles on said information read and/or write medium in accordance with said detection rate; control device for controlling detection sensitivity to detect said characteristic information by adjusting a detection sensitivity parameter when said determination device has provided a determination in error; and determination device for comparing a plurality of detection rates determined by said sensor device with a prescribed threshold to find a determination rate or a ratio of a detection rate count exceeding said threshold to a detection rate count to be compared with and then determine that the information read and/or write medium has said wobbled track when said determination rate is greater than the prescribed determination threshold.

According to a fourth aspect of the invention, there is provided an information read and/or write method for distinguishing between an information read and/or write medium having a wobbled track and an information read and/or write medium having a non-wobbled track, comprising the steps of: generating a signal characteristic of a read and/or write surface of said information read and/or write medium in accordance with a light beam reflected on said information read and/or write medium; detecting the characteristic information of said read and/or write surface in accordance with the generated signal to determine a detection rate of the characteristic information per a prescribed detection time period; determining presence or absence of said wobbled track on said information read and/or write medium in accordance with said detection rate; and controlling detection sensitivity to detect said characteristic information by adjusting a detection sensitivity parameter when a determination has been provided in error in said step of determining the presence or absence of said wobbled track.

According to a fifth aspect of the invention, there is provided an information read and/or write method for distinguishing between an information read and/or write medium having a wobbled track and an information read and/or write medium having a non-wobbled track, comprising the steps of: generating a signal characteristic of a read and/or write surface of said information read and/or write medium in accordance with a light beam reflected on said information read and/or write medium; detecting the characteristic information of said read and/or write surface in accordance with the generated signal to determine a detection rate of the characteristic information per a prescribed detection time period; and comparing said plurality of detection rates with a prescribed threshold to find a determination rate or a ratio of a detection rate count exceeding said threshold to a detection rate count to be compared with and then determine the presence or absence of said wobbled track on the information read and/or write medium in accordance with a determination of whether said determination rate is greater than a prescribed determination threshold, and adjust said determination threshold when said determination has been provided in error. In particular, the determination threshold is set at a value for distinguishing between said information read and/or write medium having said wobbled track and said information read and/or write medium having said non-wobbled-track.

According to a sixth aspect of the invention, there is provided an information read and/or write method for distinguishing between an information read and/or write medium having a wobbled track and an information read and/or write medium having a non-wobbled track, comprising the steps of: generating a signal characteristic of a read and/or write surface of said information read and/or write medium in accordance with a light beam reflected on said information read and/or write medium; detecting the characteristic information of said read and/or write surface in accordance with the generated signal to determine a detection rate of the characteristic information per a prescribed detection time period; determining presence or absence of said wobbled track on said information read and/or write medium in accordance with said detection rate; controlling detection sensitivity to detect said characteristic information by adjusting a detection sensitivity parameter when a determination has been provided in error in said step of determining the presence or absence of said wobbled track; and comparing said plurality of detection rates with a prescribed threshold to find a determination rate or a ratio of a detection rate count exceeding said threshold to a detection rate count to be compared with and then determine that the information read and/or write medium has said wobbled track when said determination rate is greater than the prescribed determination threshold.

According to a seventh aspect of the invention, there is provided a computer data signal embodied in a carrier wave and representing a series of instructions which cause a computer to perform steps to distinguish between an information read and/or write medium having a wobbled track and an information read and/or write medium having a non-wobbled track, said program information comprising the steps of: generating a signal characteristic of a read and/or write surface in accordance with a light beam reflected on said information read and/or write medium to be determined; detecting the characteristic information of said read and/or write surface in accordance with the generated signal to determine a detection rate of the characteristic information per a prescribed detection time period; determining presence or absence of said wobbled track on said information read and/or write medium in accordance with said detection rate, and controlling detection sensitivity to detect said characteristic information by adjusting a detection sensitivity parameter when a determination has been provided in error in said step of determining the presence or absence of said wobbled track.

According to an eighth aspect of the invention, there is provided a computer data signal embodied in a carrier wave and representing a series of instructions which cause a computer to perform steps to distinguish between an information read and/or write medium having a wobbled track and an information read and/or write medium having a non-wobbled track, said program information comprising the steps of: generating a signal characteristic of a read and/or write surface of said information read and/or write medium in accordance with a light beam reflected on said information read and/or write medium to be determined; detecting the characteristic information of said read and/or write surface in accordance with the generated signal to determine a detection rate of the characteristic information per a prescribed detection time period; and comparing said plurality of detection rates with a prescribed threshold to find a determination rate or a ratio of a detection rate count exceeding said threshold to a detection rate count to be compared with and then determine the presence or absence of said wobbled track on the information read and/or write medium in accordance with a determination of whether said determination rate is greater than a prescribed determination threshold, and adjust said determination threshold when said determination has been provided in error. In particular, the determination threshold is set at a value for distinguishing between said information read and/or write medium having said wobbled track and said information read and/or write medium having said non-wobbled track.

According to a ninth aspect of the invention, there is provided a computer data signal embodied in a carrier wave and representing a series of instructions which cause a computer to perform steps to distinguish between an information read and/or write medium having a wobbled track and an information read and/or write medium having a non-wobbled track, said program information comprising the steps of generating a signal characteristic of a read and/or write surface of a information read and/or write medium of said information read and/or write medium in accordance with a light beam reflected on said information read and/or write medium to be determined; detecting the characteristic information of said read and/or write surface in accordance with the generated signal to determine a detection rate of the characteristic information per a prescribed detection time period; determining presence or absence of said wobbled track on said information read and/or write medium in accordance with said detection rate; controlling detection sensitivity to detect said characteristic information by adjusting a detection sensitivity parameter when a determination has been provided in error in said step of determining the presence or absence of said wobbled track; and comparing said plurality of detection rates with a prescribed threshold to find a determination rate or a ratio of a detection rate count exceeding said threshold to a detection rate count to be compared with and then determine that the information read and/or write medium has said wobbled track when said determination rate is greater than the prescribed determination threshold.

The invention according to the first, fourth, and seventh aspects is adapted to generate a signal characteristic of the read and/or write surface in accordance with a light beam reflected on the information read and/or write medium to be determined. However, it has not yet been determined whether the signal derives from a wobbled or a non-wobbled information read and/or write medium. Therefore, the detection rate of the characteristic information contained in the signal per a prescribed detection time period is further determined. When the detection rate has become less than the prescribed detection sensitivity threshold, a detection sensitivity parameter is adjusted. In this case, the parameter is adjusted such that the detection rate can well represent the information regarding the presence or absence of wobbles to determine the presence or absence of wobbles in accordance with the value of the detection rate.

The invention according to the second, fifth, and eighth aspects is adapted to generate a signal characteristic of the read and/or write surface in accordance with a light beam reflected on the information read and/or write medium to be determined. However, it has not yet been determined whether the signal derives from a wobbled or a non-wobbled information read and/or write medium. Therefore, the detection rate of the characteristic information contained in the signal per a prescribed detection time period is further determined. Furthermore, a plurality of detection rates are compared with a prescribed threshold to find a determination rate or a ratio of a detection rate count to be compared with to a detection rate count exceeding the threshold. Then, the presence or absence of wobbles on the information read and/or write medium is determined in accordance with a determination of whether the determination rate is greater than a prescribed determination threshold. In addition to this, the determination threshold is adjusted when the determination has been provided in error. This improves the accuracy of determining the presence or absence of wobbles.

The, invention according to the third, sixth, and ninth aspects is adapted to generate a signal characteristic of the read and/or write surface in accordance with a light beam reflected on the information read and/or write medium to be determined. However, it has not yet been determined whether the signal derives from a wobbled or a non-wobbled information read and/or write medium. Therefore, the detection rate of the characteristic information contained in the signal per a prescribed detection time period is further determined. Then, the presence or absence of wobbles is determined in accordance with the detection rate. When the determination has been provided in error, the detection sensitivity parameter is adjusted such that the detection rate can thereby well represent the information regarding the presence or absence of wobbles. Furthermore, a plurality of detection rates are compared with a prescribed threshold to find a determination rate or a ratio of a detection rate count to be compared with to a detection rate count exceeding the threshold. When the determination rate is greater than the prescribed determination threshold, it is determined that the information read and/or write medium is wobbled. On the other hand, when the determination rate is less than the prescribed determination threshold, the determination threshold is adjusted to thereby improve the accuracy of determining the presence or absence of wobbles.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Now, the present invention will be explained below in more detail with reference to the accompanying drawings in accordance with the embodiments. Incidentally, as an embodiment, described is a versatile information read and/or write apparatus which makes it possible to use at least the DVD-ROM (including the DVD-Video), DVD-R, and DVD-RW.

Figure 1:
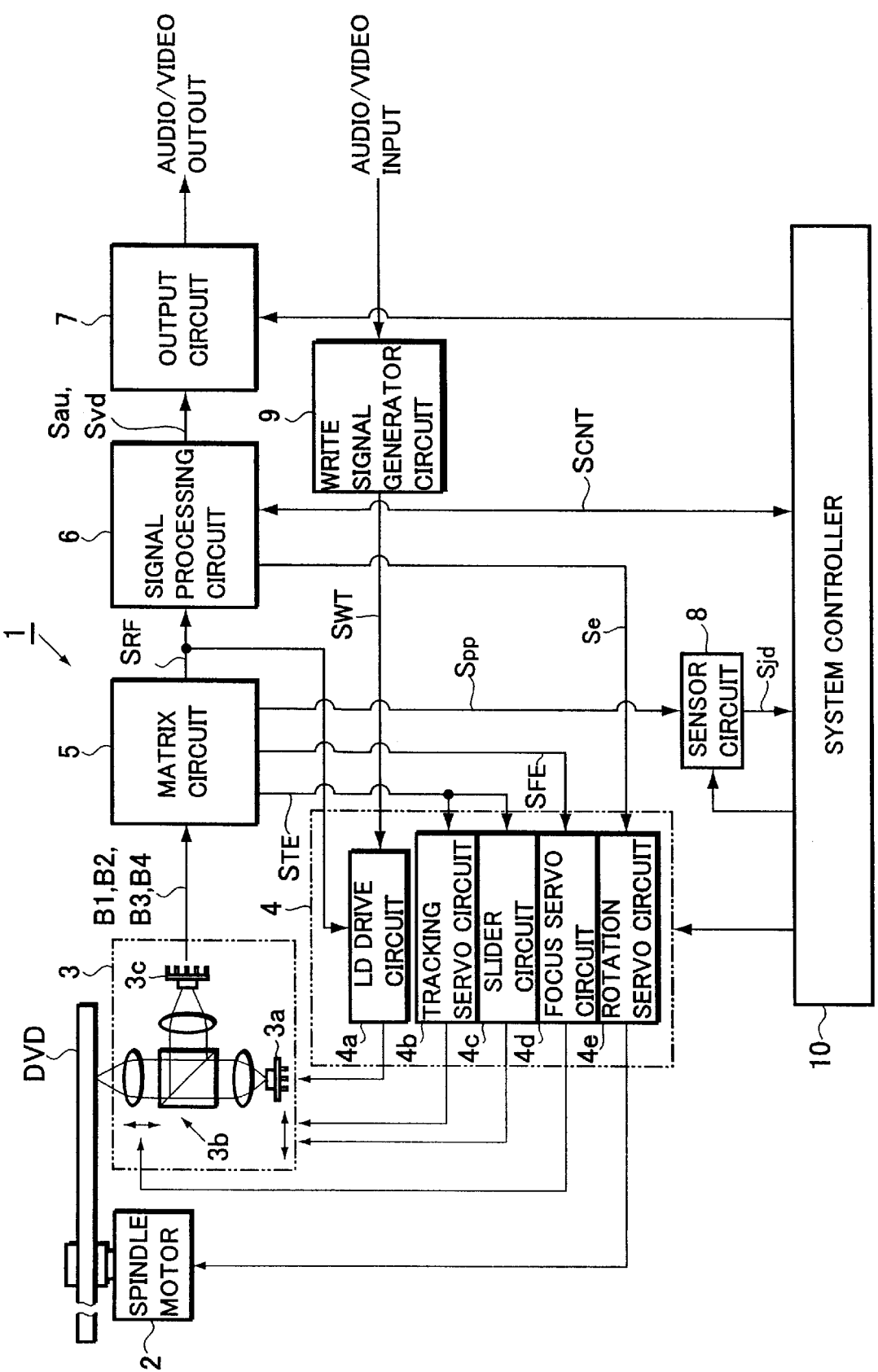
FIG. 1 is a block diagram illustrating the configuration of an information read and/or write apparatus according to an embodiment of the present invention.

FIG. 1 is a block diagram illustrating the configuration of an information read and/or write apparatus 1 according to this embodiment.

Referring to FIG. 1, the information read and/or write apparatus 1 comprises a spindle motor 2 for rotating a loaded DVD at a prescribed linear speed, an optical pickup 3, a control circuit 4 for use such as with servo control of the spindle motor 2 and the optical pickup 3, a matrix circuit 5, a signal processing circuit 6, an output circuit 7, a sensor circuit 8, a write signal generator circuit 9, and a system controller 10.

The optical pickup 3 comprises a semiconductor laser device 3a, an optical system 3b, and a light-receiving device 3c.

To write information on the DVD, the optical pickup 3 irradiates the DVD with a write laser beam emitted from the semiconductor laser device 3a via the optical system 3b, (where the laser beam has the information of write signal SWT, described later). For purposes such as on-track irradiation of the storage surface of the DVD with a write laser beam, a laser beam reflected on the DVD (a reflected beam) passes through the optical system 3b and is then converted into an electric signal at the light-receiving device 3c. Then, the control circuit 4 performs servo control or the like in accordance with the resulting electric signal.

To read information, the DVD is irradiated with a read laser beam, which is emitted from the semiconductor laser device 3a and has a prescribed output power, through the optical system 3b. Then, the laser beam reflected on the DVD passes through the optical system 3b and is then converted into an electric signal at the light-receiving device 3c for output. Upon reading information, the laser beam reflected on the DVD passes also through the optical system 3b and is then converted into an electric signal at the light-receiving device 3c. Then, the control circuit 4 performs servo control in accordance with the resulting electric signal.

Figure 2:
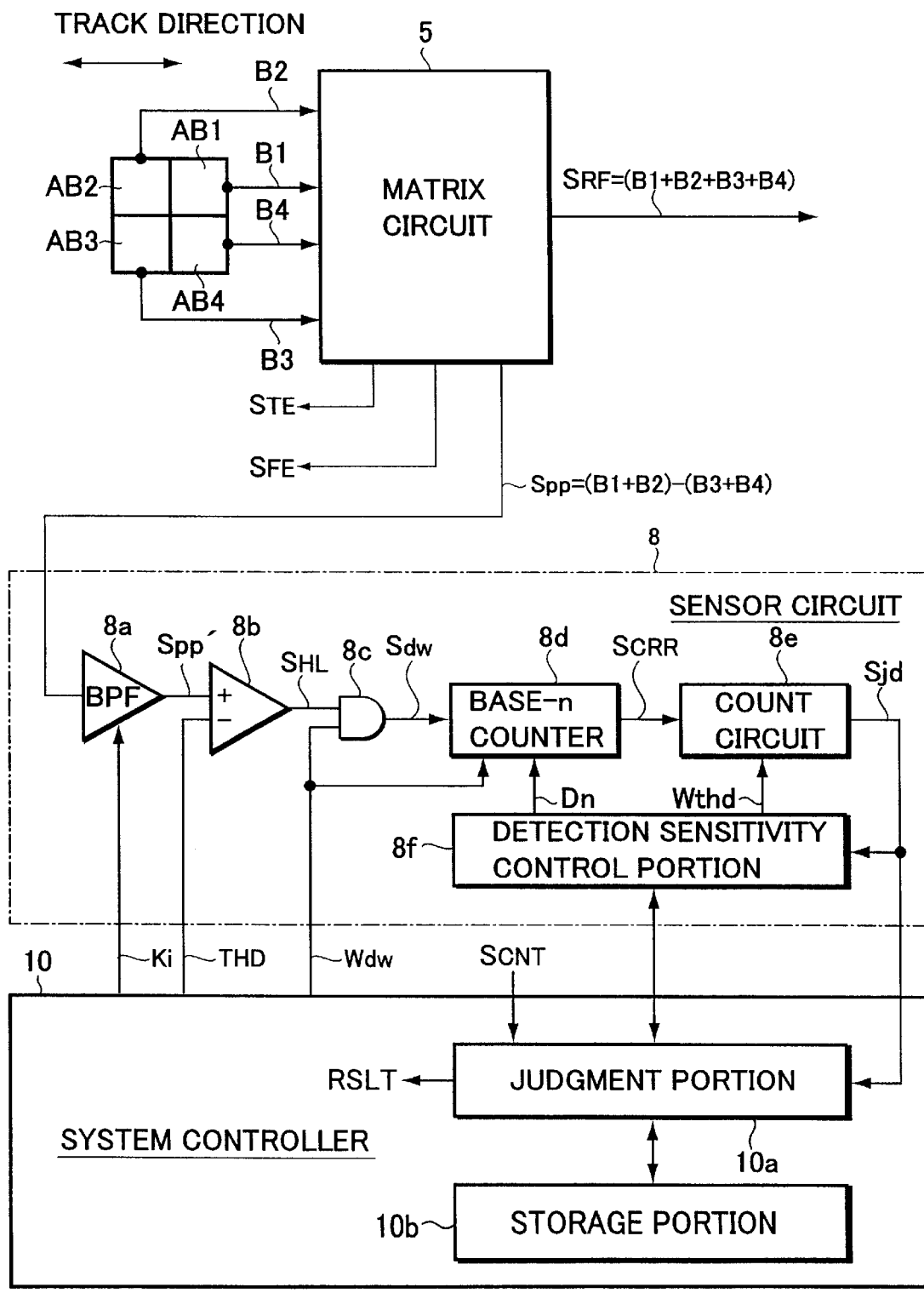
FIG. 2 is a block diagram illustrating the configuration of the light-emitting device, the sensor circuit, and the system controller, which are incorporated in the information read and/or write apparatus according to this embodiment.

As shown in FIG. 2, the light-receiving device 3c has a plurality of separate light-receiving faces AB1, AB2, AB3, AB4. The light-receiving faces AB1, AB2, AB3, AB4 separately receive the aforementioned laser beam reflected on the DVD, thereby delivering a plurality of electric signals B1, B2, B3, B4. Incidentally, as shown in FIG. 2, the light-receiving faces AB1, AB2, AB3, AB4 are arranged so as to satisfy the prescribed positional relationship with the direction of the tracks on the DVD.

The matrix circuit 5 computes the electric signals B1, B2, B3, B4 to thereby generate and deliver RF signal SRF, tracking error signal STE, focus error signal SFE, and push-pull signal Spp. In this case, the aforementioned electric signals are computed to yield (B1+B2+B3+B4) to thereby generate the RF signal SRF, while yielding {(B1+B2)−(B3+B4)} to generate the push-pull signal Spp.

Referring back to FIG. 1, the control circuit 4 comprises an LD drive circuit 4a, a tracking servo circuit 4b, a slider circuit 4c, a focus servo circuit 4d, and a rotation servo circuit 4e.

Upon writing information, the LD drive circuit 4a modulates a drive current in accordance with the write signal SWT supplied by the write signal generator circuit 9 and then supplies the resulting drive current to the semiconductor laser device 3a, which in turn launches a write laser beam (having information of the write signal SWT). Upon reading information, the LD drive circuit 4a supplies a drive current having a prescribed value to the semiconductor laser device 3a, which in turn launches a read laser beam. Furthermore, the LD drive circuit 4a detects the level of the RF signal SRF and then performs PLL (Phase Locked Loop) control to automatically adjust the aforementioned drive current, thereby setting the power of the write and read laser beam to an appropriate value.

The tracking servo circuit 4b detects in accordance with the tracking error signal STE whether the DVD is irradiated on track with a laser beam, and controls the position of the optical system 3b of the optical pickup 3 in order to irradiate the DVD on track with the laser beam.

The slider circuit 4c displaces the optical pickup 3 in the radial direction of the DVD.

The focus servo circuit 4d detects in accordance with the focus error signal SFE whether the DVD is irradiated in focus with a laser beam, and controls the position of the optical system 3b of the optical pickup 3 in order to irradiate the DVD in focus with the laser beam.

The rotation servo circuit 4e detects, in accordance with rotation error signal Se (which will be described later), whether the spindle motor 2 rotates at the prescribed linear speed, and performs servo control such that the spindle motor 2 rotates at the prescribed linear speed.

The signal processing circuit 6 comprises a demodulator circuit, a stream separator circuit, and a decoder circuit, which are not illustrated. The signal processing circuit 6 performs A/D conversion on the RF signal SRF and then allows the demodulator circuit to carry out demodulation processing and error correction processing in conformity with the DVD data format. The signal processing circuit 6 is also adapted such that the stream separator circuit separates the resulting signal into an audio stream and a video stream, and the decoder circuit decodes the audio and video stream to thereby deliver the resulting audio data Sau and video data Svd. The signal processing circuit 6 also supplies the rotation error signal Se resulting from the demodulation processing and the error correction processing to the rotation servo circuit 4e, and then supplies control data SCNT resulting from the aforementioned demodulation to the system controller 10.

The output circuit 7 generates audio/video output to deliver decoded audio data Sau as digital data or performs D/A conversion on the decoded audio data Sau to output an analog audio signal. Furthermore, the output circuit 7 delivers decoded video data Svd as digital data or converts the decoded video data Svd into a composite signal containing audio data Sau for output.

The write signal generator circuit 9 performs processing such as compressive modulation on audio or video input signals (supplied from the outside) in order to thereby generate the write signal SWT, which is in turn supplied to the LD drive circuit 4a.

As shown in FIG. 2, the sensor circuit 8 comprises a band-pass filter 8a for allowing only those components having the prescribed frequencies to pass therethrough in order to eliminate noise in the push-pull signal Spp. The sensor circuit 8 further comprises a comparator 8b for shaping the waveform of the push-pull signal Spp', which has passed through the band-pass filter 8a, into binary signal SHL for output. The sensor circuit 8 also comprises a window circuit 8c for allowing only those binary signals SHL, which are within the range of the prescribed time window T2, to pass therethrough as detection signal Sdw. The sensor circuit 8 further comprises a base-n counter 8d for counting the detection signal Sdw, a count circuit 8e for counting carry signal SCRR delivered by the base-n counter 8d, and a detection sensitivity control portion 8f.

In this configuration, the pass band frequency of the band-pass filter 8a is controllably adjusted in accordance with filter factor signal ki supplied by the system controller 10.

Figure 3:
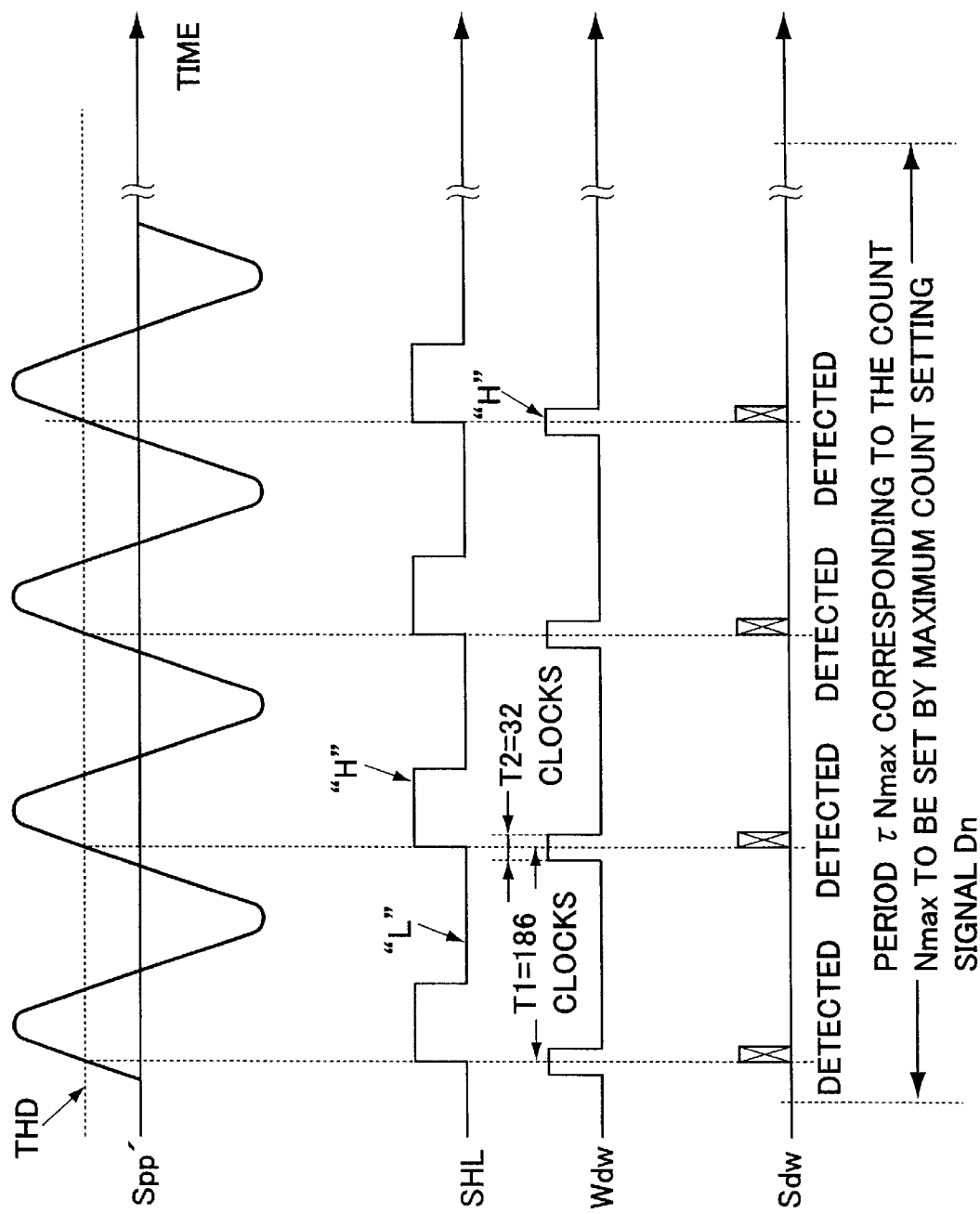
FIG. 3 is an explanatory view illustrating the waveform indicative of the function of the sensor circuit.

The comparator 8b compares threshold voltage THD supplied by the system controller 10 with the push-pull signal Spp'. As shown in FIG. 3, the comparator 8b then delivers the binary signal SHL which takes on a logic "H" level when the push-pull signal Spp' has a higher level than the threshold voltage THD and a logic "L" level when the push-pull signal Spp' has a lower level than the threshold voltage THD.

The window circuit 8c comprises an AND gate. As shown 20 in FIG. 3, the window circuit 8c employs, as the time window T2, a time period in which rectangular signal Wdw supplied by the system controller 10 is at a logic "H" level, and delivers as the detection signal Sdw only the binary signal SHL which occurs within the time window T2.

Figure 6:
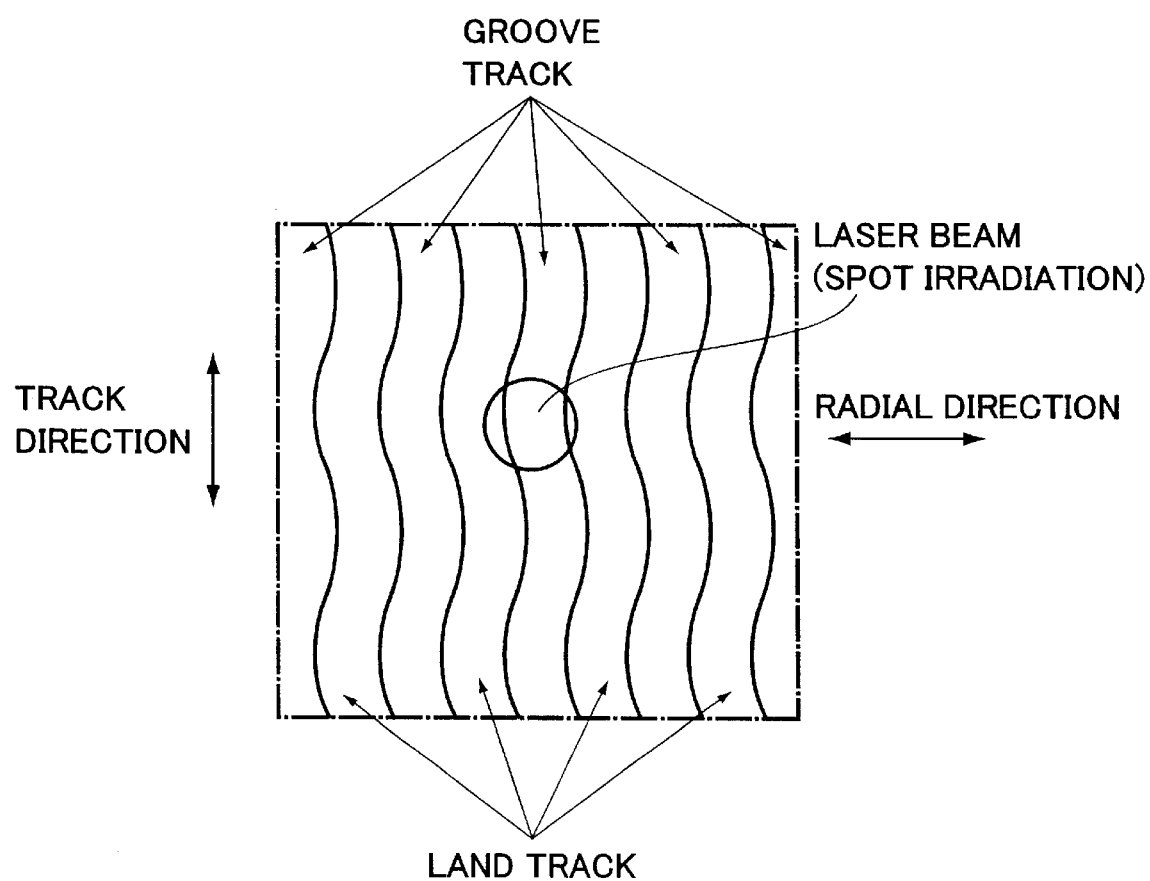
FIG. 6 is a schematic view illustrating the physical structure of a DVD-RW.

More specifically, the rectangular signal Wdw generates time windows T2 of a logic "H" level in phase with prescribed time period T1(=186 system clocks), each time window T2 being adapted to have a logic "H" level over a width of 32 system clocks (+/−16 system clocks) As schematically shown in FIG. 6, the wobbled groove tracks of a typical DVD-RW are spot-irradiated with a laser beam for scanning in the direction of the track to obtain the binary signal SHL, which has a logic "H" level during a cycle of the time period T1(=186 system clocks). Incidentally, the system clock device the cycle of a system clock signal which is preset to the prescribed frequency in the information read and/or write apparatus 1. The 186 cycles of the system clock signal are employed as the aforementioned time period T1, and the 32 cycles thereof are employed as the aforementioned time window T2.

The base-n counter 8d is designed to allow maximum count setting signal Dn supplied by the detection sensitivity control portion 8f to variably adjust its maximum count Nmax.

For example, suppose Dn is set to 100. In this case, the base-ri counter 8d delivers the carry signal SCRR each time the base-n counter 8d counts 100 of the detection signal Sdw, thus repeating counting operations. When Dn is set to 200, the base-n counter 8d delivers the carry signal SCRR each time the base-n counter 8d counts 200 of the detection signal Sdw, thus repeating counting operations.

That is, the base-n counter 8d is a variable counter in which the upper limit of counts is adjusted by device of the maximum count setting signal Dn, being adapted to deliver the carry signal SCRR to be thereby reset and started to repeat counting operations. Furthermore, the base-n counter 8d counts the detection signal Sdw of a logic "H" level in phase with the timing at which the time window T2 of the rectangular signal Wdw occurs. In addition to this, when the detection signal Sdw has a logic "L" level at the time the time window T2 occurs, the base-n counter 8d is reset and started to repeat counting operations.

Figure 4:
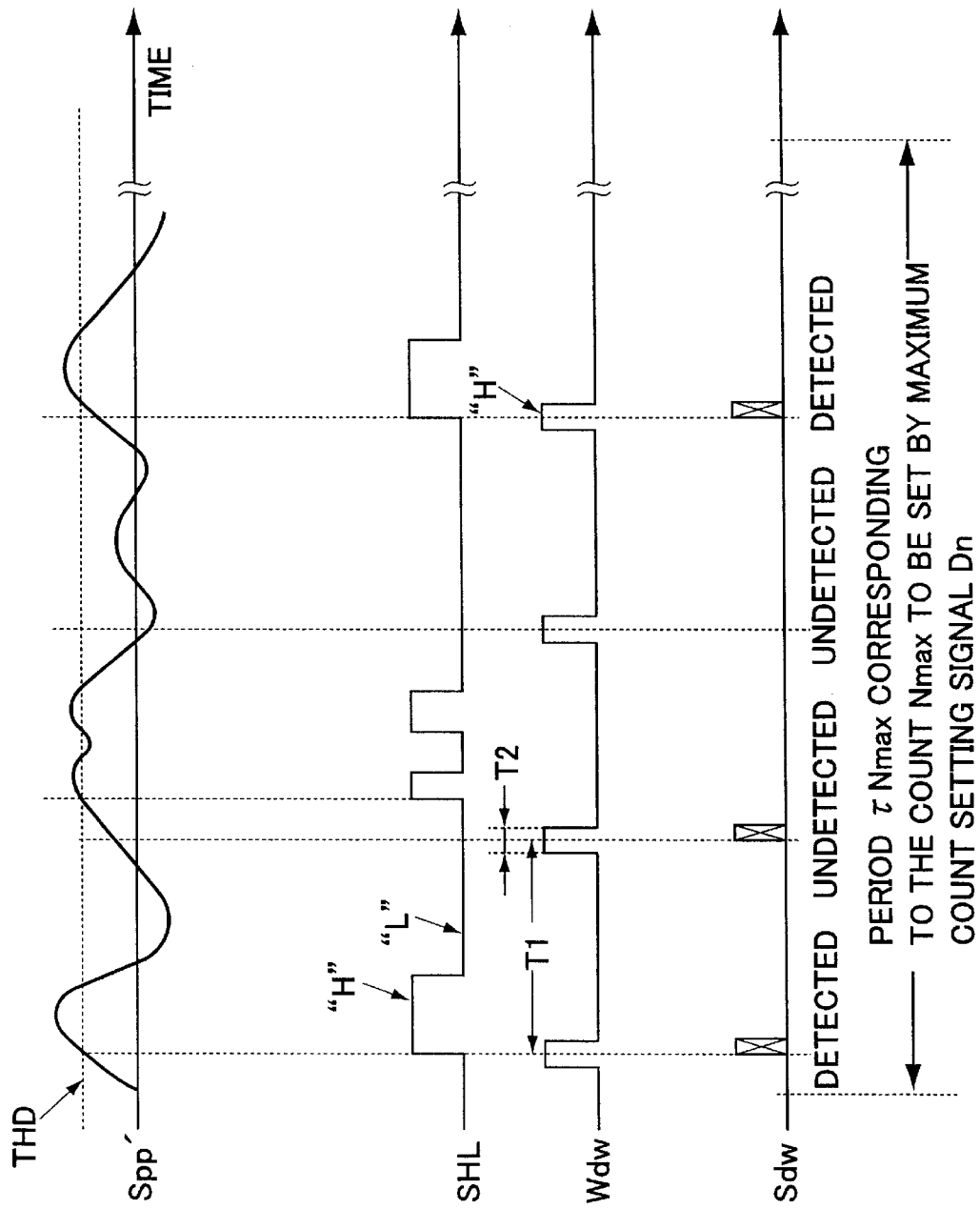
FIG. 4 is another explanatory view illustrating the waveform indicative of the function of the sensor circuit.

Suppose that the detection signal Sdw takes on a logic "H" level continually at each time period T1. Even in this case, the base-n counter 8d delivers the carry signal SCRR when the continual counts have exceeded the maximum count Nmax which is set by device of the maximum count setting signal Dn. However, as shown in FIG. 4, suppose that a non-wobbled DVD-ROM is read causing a push-pull signal Spp' different from a regular waveform to occur, so that the continual counts of the detection signal Sdw having a logic "H" level do not reach the maximum count Nmax which is set by device of the maximum count setting signal Dn. In this case, the base-n counter 8d is reset and started without delivering the carry signal SCRR.

The count circuit 8e counts the carry signal SCRR within the detection period ithd which is set by device of the detection period setting signal Wthd supplied by the detection sensitivity control portion 8f, and then supplies the resulting count Sjd to the system controller 10 and the detection sensitivity control portion 8f.

Figure 5:
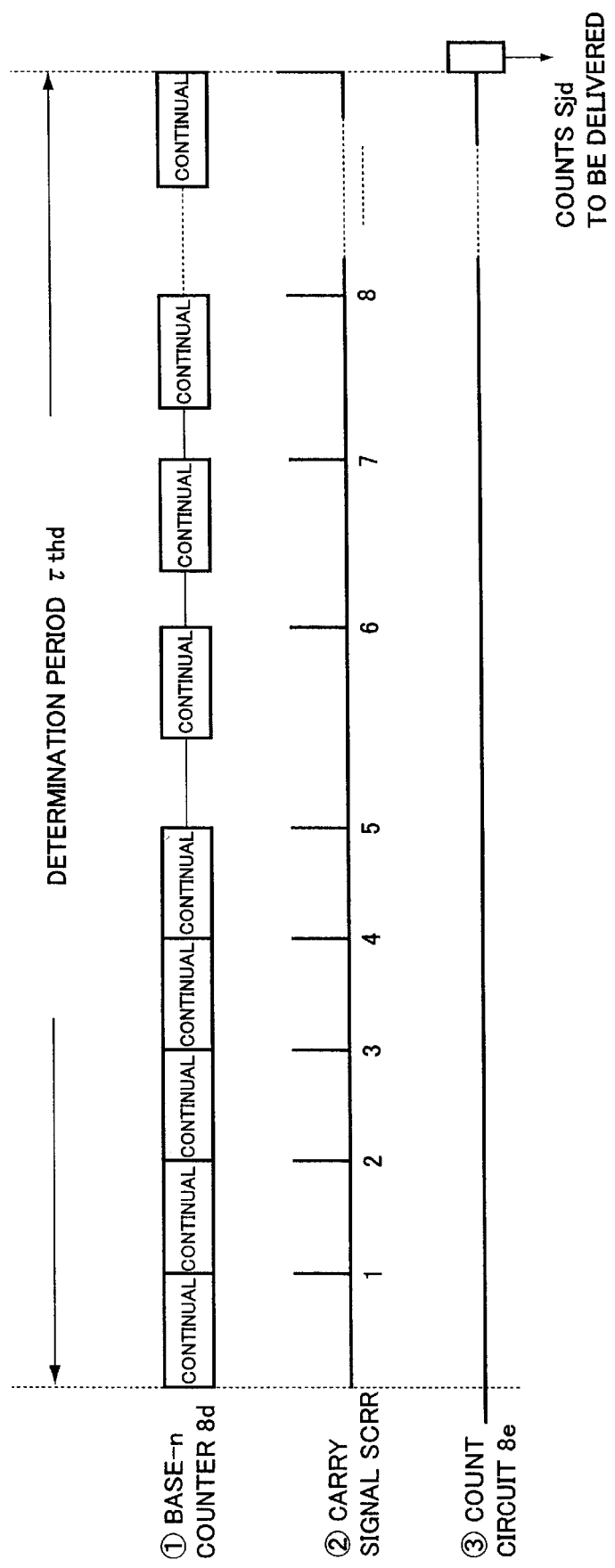
FIG. 5 is still another explanatory view illustrating the waveform indicative of the function of the sensor circuit.

That is, as shown by ① to ③ in FIG. 5, when the base-n counter 8d delivers the carry signal SCRR each time the base-n counter 8d takes on the Nmax count continually, the count circuit 8e counts the carry signals SCRR within each detection period ithd and delivers the resulting count Sjd at the end of the detection period τthd. In addition, the count circuit 8e is adapted to repeat the aforementioned counting operation during each detection period τthd to deliver a new count Sij until the system controller 10 issues an instruction to stop the counting operation.

In accordance with the instruction provided by the system controller 10, the detection sensitivity control portion 8f supplies the aforementioned maximum count setting signal Dn and the detection period setting signal Wthd to the base-n counter 8d and the count circuit 8e, respectively. In addition to this, the detection sensitivity control portion 8f computes the ratio of the count Sjd provided by the count circuit 8e to the detection period τthd being set by the detection period setting signal Wthd, thereby determining the detection factor α of a binary signal Sdw.

More specifically, the maximum count JDmax, which the count circuit 8e takes on within the detection period τthd, is determined by computing τthd/τNmax, where τNmax is the time required for the count circuit 8e to deliver a carry signal SCRR after Nmax continual counting operations. Then, the percentage ratio of the resulting count Sjd to the maximum count JDmax, that is, (Sjd/JDmax)×100 is employed as the detection factor α.

Furthermore, suppose that the presence of wobbling has been determined in error at a judgment portion 10a, as described later. In this case, to improve detection sensitivity, an adjustment is made to both the maximum count Nmax and the detection period τthd (both acting as detection sensitivity parameters), or either the maximum count Nmax or the detection period τthd. This adjustment allows the maximum count setting signal Dn and the detection period setting signal Wthd to perform feedback control on the maximum count Nmax of the base-n counter 8d and the detection period ithd of the count circuit 8e.

In summary, the detection sensitivity control portion 8f is adapted such that the maximum count Nmax is adjusted to allow the base-n counter 8d to readily generate the carry signal SCRR or the detection period τthd is adjusted to increase the value of the detection factor α, thereby improving the detection sensitivity after the adjustment.

Incidentally, it is to be understood that the circuit designer determines as appropriate in accordance with the design specification whether to adjust both the maximum count Nmax and the detection period τthd, or either the maximum count Nmax or the detection period τthd.

To realize each of the circuits 8a to 8f which constitute the sensor circuit 8 shown in FIG. 2, individual semiconductor integrated circuits (IC) may be employed. Alternatively, an IC which has a computing function, such as a digital signal processor (DSP), may be employed to realize some or all of the circuits. On the other hand, a computer program for adjusting detection sensitivity may be employed to realize the circuits.

In short, a circuit arrangement other than that shown in FIG. 2 may be employed to realize the sensor circuit 8 as long as the arrangement can provide the aforementioned function.

On the other hand, the system controller 10 has a microprocessor (MPU) to execute the prescribed system program, thereby controlling the entire operation of the information read and/or write apparatus 1. The system controller 10 also comprises the judgment portion 10a which is realized using a system program, and a storage portion 10b which is made up of a nonvolatile semiconductor memory.

The storage portion 10b is provided with characteristic data A. The characteristic data A, indicative of the incidence of determination rate K, is empirically determined based on the count Sjd, which is empirically determined by reading and detecting a non-wobbled typical DVD-ROM having a non-wobbled track in accordance with an algorithm having the same function as that of the aforementioned sensor circuit 8. The storage portion 10b is also provided with characteristic data B. The characteristic data B, indicative of the incidence of determination rate K, is empirically determined based on the count Sjd, which is empirically determined by reading and detecting the wobble of a typical DVD-RW having a wobbled track in accordance with an algorithm having the same function as that of the aforementioned sensor circuit 8.

The characteristic data A of a non-wobbled DVD-ROM is described below in more detail. The determination rate K is a percentage ratio of Nk to Mmax {(Nk/Mmax)×100(%)}. It is determined that "there is a wobble" when the aforementioned detection factor α having a value of (Sjd/JDmax)×100 has exceeded the prescribed detection sensitivity threshold αthd. Then, the detection factor α, determined for the (plural) counts Sjd of the prescribed count Mmax, is compared with the detection sensitivity threshold αthd. Thus, the count Nk is determined at which it is judged that "there is a wobble" in this comparison. That is, the detection factor α is determined for the plural counts Sjd of Mmax and the count Nk is determined at which it holds that α>αthd (which allows for determining that "there is a wobble"). Accordingly, the occurrence ratio of the count Nk, at which the process determines that "there is a wobble", to Mmax is employed as the determination rate K (%).

Then, plural determination rates K are determined for a plurality (any number of) DVD-ROMs, and then a statistical technique is used to find the incidence of those determination rates K (the probability of determining that the DVD is truly a DVD-ROM). The characteristic data A is thereby determined which is indicative of the incidence of the aforementioned determination rates K. Likewise, for a wobbled typical DVD-RW, the detection factor α is also determined for the plural counts Sjd of Mmax and the count Nk is determined at which it holds that α>αthd (which allows for determining that "there is a wobble") Accordingly, the occurrence ratio of the count Nk, at which the process determines that "there is a wobble", to Mmax is employed as the determination rate K (%).

Then, plural determination rates K are determined for a plurality (any number of) DVD-RWs, and then the statistical technique is used to find the incidence of those determination rates K (the probability of determining that the DVD is truly a DVD-RW). The characteristic data B is thereby determined which is indicative of the incidence of the aforementioned determination rates K.

Figure 7:
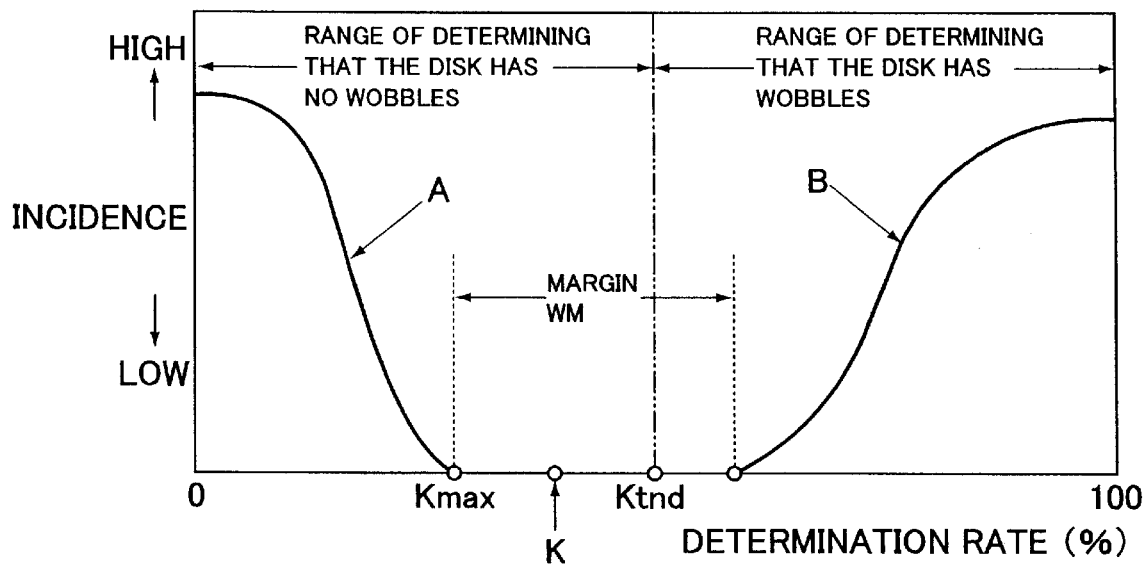
FIG. 7 is an explanatory view illustrating the processing for improving the accuracy of wobble determination which is carried out in the determination portion.

Thus, as shown in FIG. 7, the characteristic data A indicated by the characteristic curve A and the characteristic data B indicated by the characteristic curve B are stored in the storage portion 10b at the time of shipping.

The judgment portion 10a computes an actual determination rate K based on the count Sjd which is obtained by reading and detecting a DVD loaded actually on the information read and/or write apparatus 1. When the determination rate K has a value less than the prescribed determination threshold Kthd, the judgment portion 10a determines that the DVD is a non-wobbled one, while determining that the DVD is a wobbled one when the determination rate K has a value greater than the prescribed determination threshold Kthd. That is, plural counts Sjd of Mmax which occur due to the actual loading of the DVD are entered to compare the detection factor α of each of the counts Sjd with the detection sensitivity threshold αthd. The count Nk which satisfies the condition of α>αthd (for determining that "there is a wobble") is then determined to compute K=(Nk/Mmax)×100, thereby determining the determination rate K. Subsequently, when the actually found determination rate K has a value greater than the prescribed determination threshold Kthd, the process determines that the DVD is a wobbled one.

On the other hand, as shown in FIG. 7, the determination threshold Kthd is set at the time of shipping within a range (a margin range) WM in which the lowest incidence is provided for both a DVD-ROM (a non-wobbled disk) and a DVD-RW (a wobbled disk)

Accordingly, when the actually found determination rate K satisfies that K<Kthd, the process determines that "there is no wobble". On the other hand, when the actually found determination rate K satisfies that K≧Kthd, the process determines that "there is a wobble". A resulting determination result RSLT is then provided to allow the system controller 10 to start writing or reading information on the DVD according to its type in accordance with the determination result RSLT.

In addition, after the judgment portion 10a has determined the presence or absence of wobbles as described above, the system controller 10 moves the optical pickup 3 to a prescribed area of the DVD to read information on the prescribed area. The judgment portion 10a then checks whether the signal processing circuit 6 has delivered the prescribed control data SCNT as well as whether the contents of the control data SCNT correlate with the determination result RSLT which has been found in the determination of the presence or absence of wobbles. It is then checked whether the aforementioned determination result RSLT in the determination of presence or absence of wobbles is in error. If the determination is provided in error, the determination threshold. Kthd is changed, or the maximum count Nmax and the detection period τthd are adjusted within the sensor circuit 8 as described above, thereby improving the accuracy of the determination of presence or absence of wobbles.

Figure 8:
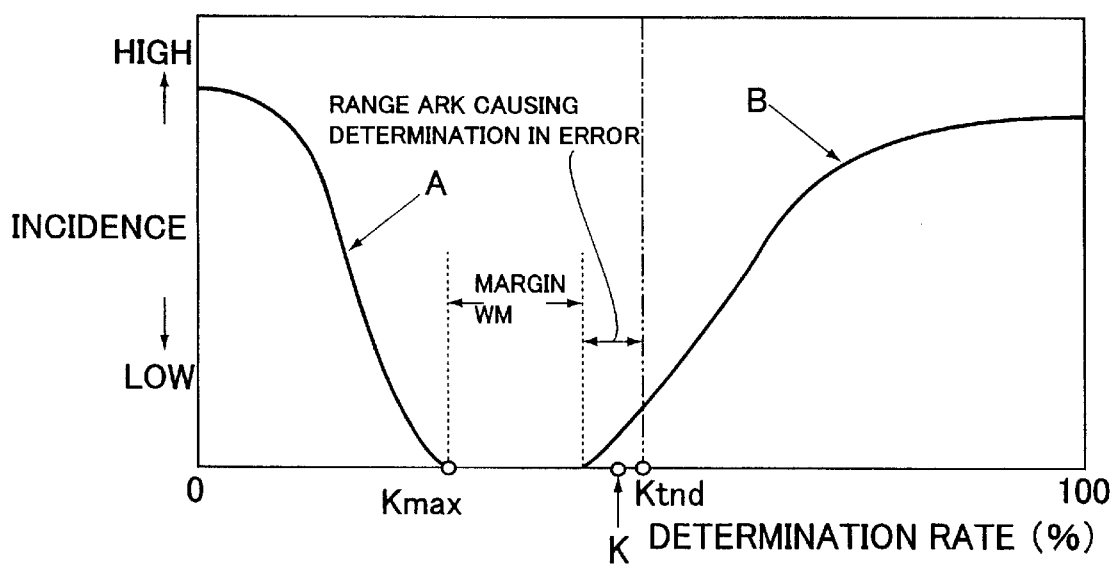
FIG. 8 is another explanatory view illustrating the processing for improving the accuracy of wobble determination which is carried out in the determination portion.
Figure 9:
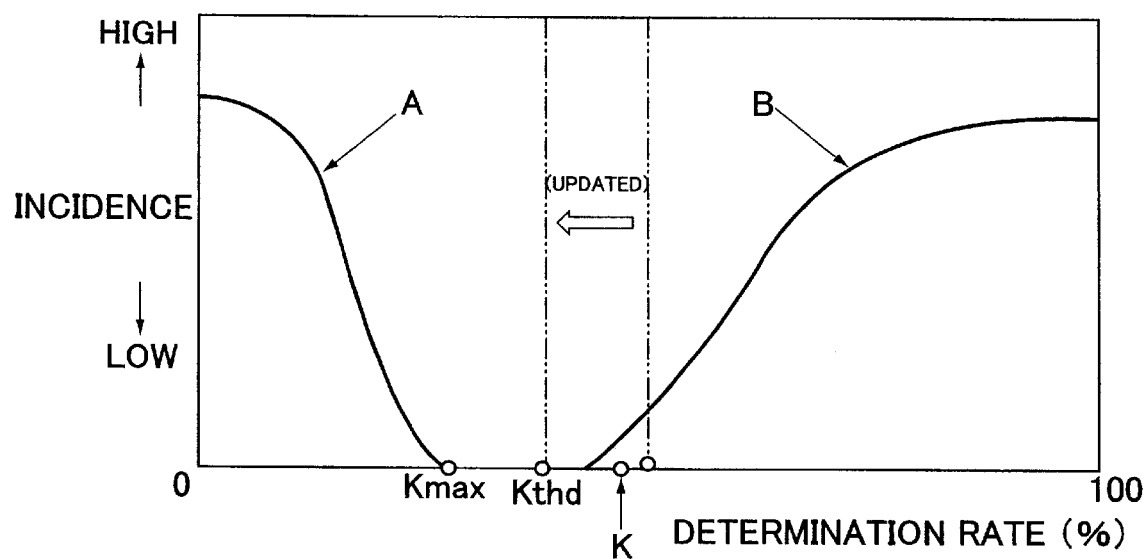
FIG. 9 is still another explanatory view illustrating the processing for improving the accuracy of wobble determination which is carried out in the determination portion.

Incidentally, a method for changing the determination threshold Kthd will be described in more detail in the following explanation of operation. As shown in FIG. 9 illustrated corresponding to FIG. 8, suppose that the determination threshold Kthd falls outside the margin range WM between the characteristic curves A and B. In this case, the range ARK between the determination threshold Kthd and the edge of the margin range WM provides a determination in error. That is, an actually found determination rate K falling within the range ARK would cause a problem that the process determines that "there is no wobble" in spite of the fact that the process should determine that "there is a wobble".

In this context, as shown in FIG. 9, a change (update) is made so that the determination threshold Kthd falls within the margin range WM, thereby improving the accuracy of determination after the change. Incidentally, FIG. 9 shows a case for avoiding an error determination indicating that "there is no wobble" in spite of the fact that the process should determine that "there is a wobble". In this case, the determination threshold Kthd is moved towards the margin range WM to satisfy the actually found determination rate K such that K≧Kthd, thereby allowing for determining that "there is a wobble".

Now, the operation of the information read and/or write apparatus 1 configured as described above will be described below with reference to FIG. 11.

Figure 11:
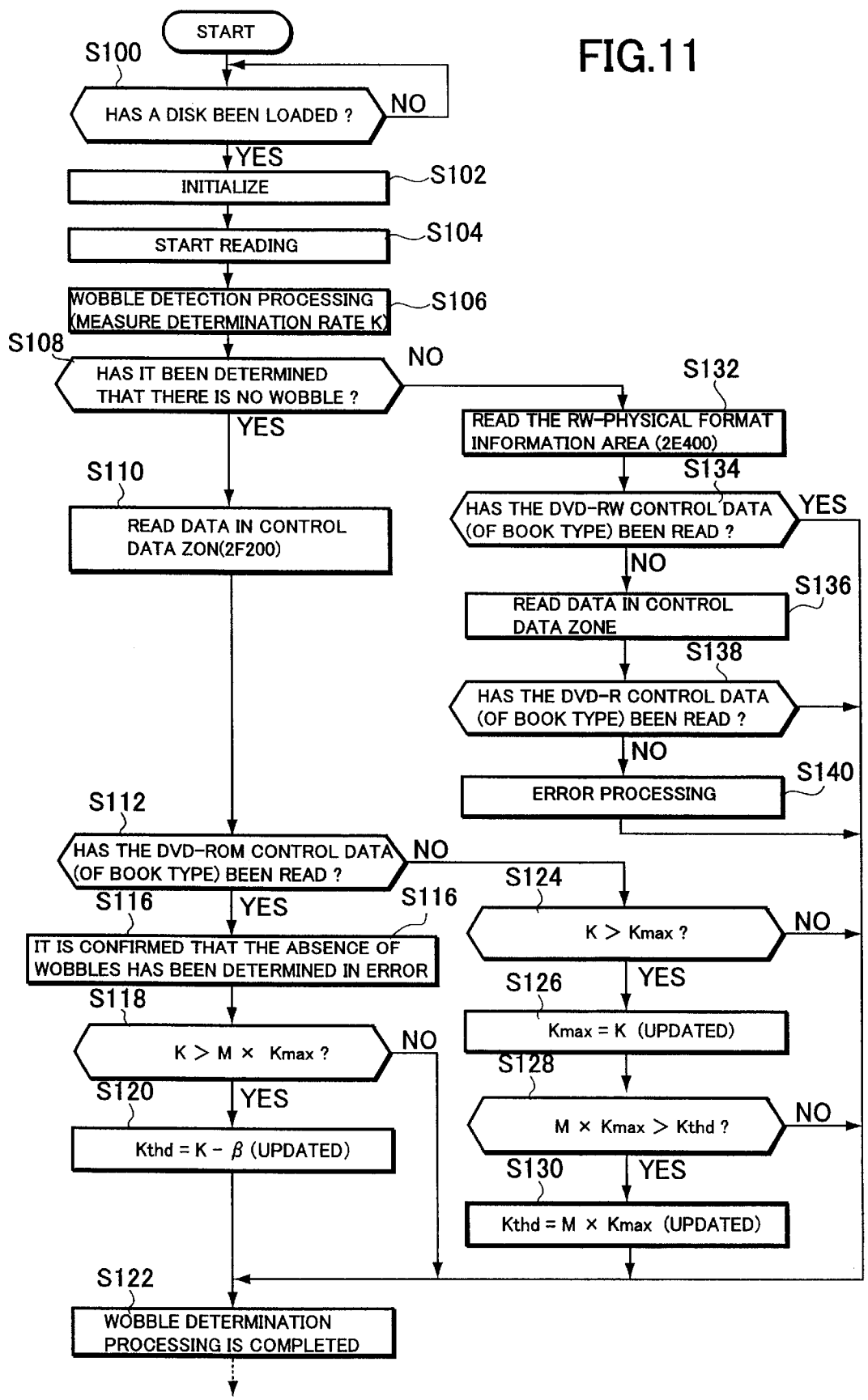
FIG. 11 is an explanatory flowchart illustrating the operation of the information read and/or write apparatus.

Prior to the explanation of the operation referring to FIG. 11, the difference of the DVD-ROM, DVD-R, and DVD-RW (DVD-RW Version 1.0) between their physical and data structures is explained first. As shown in FIG. 6, the DVD-RW and DVD-R are provided with wobbled groove tracks and land tracks, and the wobbled groove tracks, and the land tracks are formed from the inner to outer circumference in a spiral fashion. In this arrangement, the groove tracks are irradiated with a laser spot for writing information and scanned to write information on the groove tracks, whereas the groove tracks are irradiated with a laser spot for reading information and scanned to read information thereon.

Incidentally, although not illustrated in FIG. 6, the DVD-RW Version 1.0 is adapted such that a land pre-pit is formed within the land track to define a physical address, and the optical pickup 3 reads the land pre-pit optically, thereby making it possible to detect the physical address.

Now, the data structure of the DVD-ROM, DVD-R, and DVD-RW (DVD-RW Version 1.0) is briefly explained with reference to FIG. 10. Incidentally, FIG. 10(*a*) shows each data structure of the DVD-ROM and DVD-R, and FIG. 10(*b*) shows the data structure of the DVD-RW.

The DVD-ROM, DVD-R, and DVD-RW are provided with a data area for storing main data such as audio and video data, or contents data, and a management information storage areas for storing manage information or the like.

As one of the aforementioned management information storage areas, also provided in a prescribed area near the inner circumference is a lead-in area (LIA) for storing physical information of the DVD.

Figure 10:
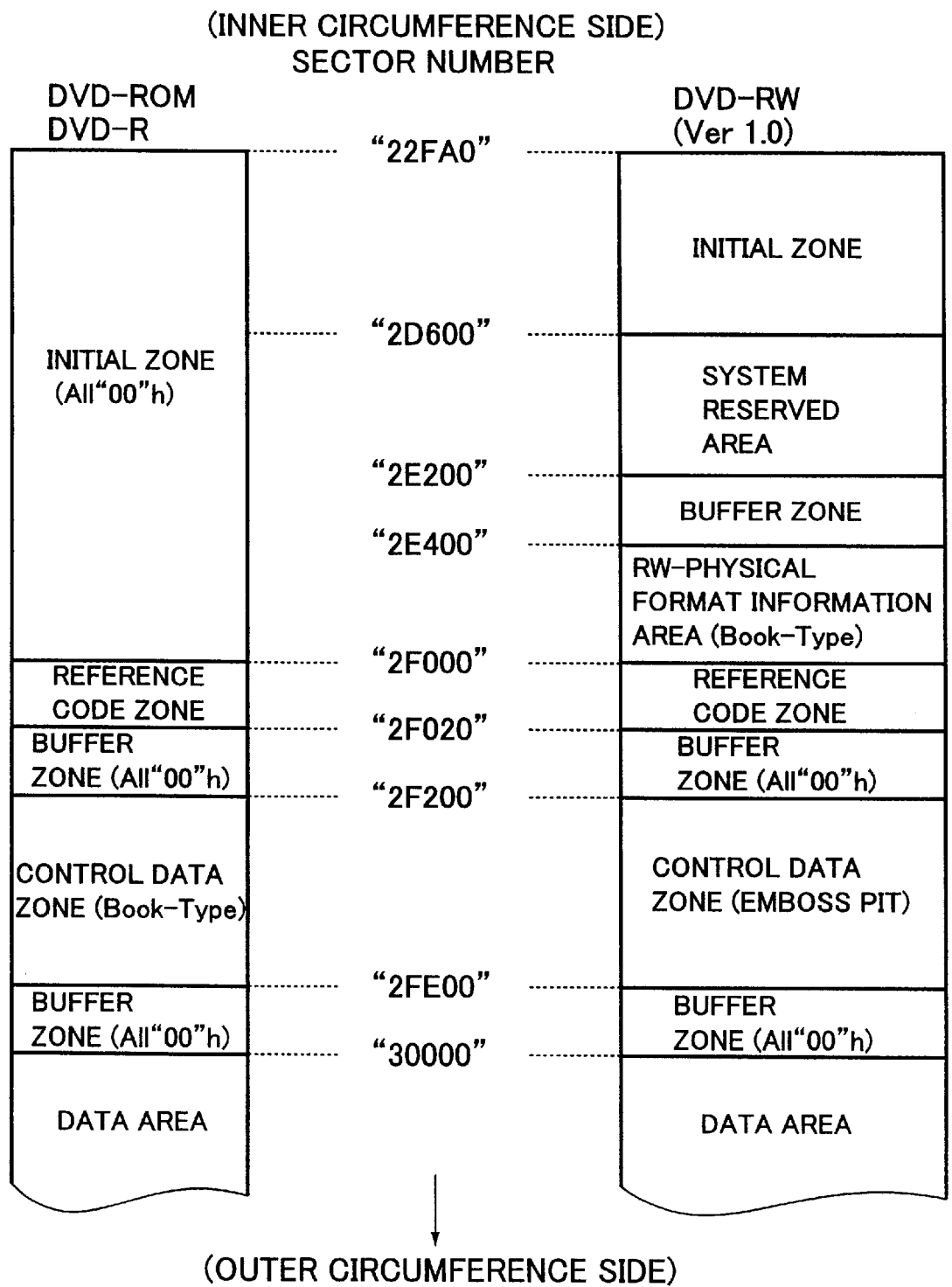
FIGS. 10(a) and 10(b) are explanatory views illustrating the data structure of a DVD-ROM, DVD-R, and DVD-RW.

As shown in FIG. 10, a data structure which is characteristic of each of the DVD-ROM, DVD-R, and DVD-RW is defined in the lead-in area LIA. The storage address (or sector number) of each type of manage information, described later, is defined in accordance with the ECC block address which is physically determined according to the information of the aforementioned wobble or land pre-pit.

The lead-in area LIA of the DVD-ROM, DVD-R, and DVD-RW starts from sector number "22FA0".

The DVD-ROM and DVD-R have an initial zone from sector number "22FA0" to before "2F000", in which hexagonal data all having values of "00" indicative of a blank is stored in this initial zone.

On the other hand, the DVD-RW has an initial zone from sector number "22FA0" to before "2D600", a system reserved area from "2D600" to before "2E200", a buffer zone from "2E200" to before "2E400", and an RW-physical format information area from "2E400" to before "2F000".

In the aforementioned buffer zone of the DVD-RW, stored is hexagonal data all having values of "00" indicative of a blank.

In the RW-physical format information area, stored is control data called a book type which is indicative of the type of the DVD, the information on read and write conditions, the information about manufacturing and the like.

All the DVD-ROM, DVD-R, and DVD-RW have the same data structure in the area from sector number "2F000" to before "30000". The area from sector number "2F000" to before "2F020" is a reference code zone, the area from sector number "2F020" to before "2F200" is a buffer zone, the area from sector number "2F200" to before "2FE00" is a control data zone, and the area from sector number "2FE00" to before "30000" is a buffer zone.

Both the aforementioned reference code zones have an emboss reference code stored thereon, and the information read and/or write apparatus 1 is set up to operate in an appropriate condition so that the emboss reference code can be read within a prescribed error rate.

In both the aforementioned buffers from "2F020" to before "2F200", stored is hexagonal data all having values of "00" which is indicative of a blank.

In the control data zone of the DVD-ROM and DVD-R, stored is control data called a book type which is indicative of the type of the DVD, the information on read and write conditions, the information about manufacturing and the like. On the other hand, an emboss pit is stored in the control data zone of the DVD-RW.

In both the aforementioned buffers from "2FE00" to before "30000", stored is hexagonal data all having values of "00" which is indicative of a blank.

In addition, the area after "30000" is a data area.

Now, with reference to FIG. 11, an explanation is made to the operation of the information read and/or write apparatus 1 to which loaded are the DVD-ROM, DVD-R, and DVD-RW, each having the lead-in area LIA. In particular, the explanation is made to the operation for carrying out the type determination and for improving the accuracy of the determination.

In step S100 of FIG. 11, the process waits until any one of the DVD-ROM, DVD-R, and DVD-RW is loaded. When a DVD is loaded, the process proceeds to step S102 to perform the initial processing.

In step S102, the detection sensitivity control portion 8*f* in the sensor circuit 8 sets a maximum count Nmax to the base-n counter 8*d* based on the maximum count setting signal Dn. In addition, the detection sensitivity control portion 8*f* sets a detection period τthd to the count circuit 8*e* based on the detection period setting signal Wthd and retrieves data regarding the detection sensitivity threshold αthd from the storage portion 10*b*.

Incidentally, the data regarding the maximum count Nmax, the detection period τthd, and the detection sensitivity threshold αthd have been stored in the storage portion 10*b* as history data which was processed and thereby obtained when the previous DVD was loaded. The base-n counter 8*d* and the count circuit 8*e* are initialized and the data regarding the detection sensitivity threshold athd is retrieved in accordance with the previous history data each time a new DVD is loaded.

Furthermore, in step S102, the judgment portion 10a reads and retrieves the determination threshold Kthd for use with judgment processing from the storage portion 10b. That is, the determination threshold Kthd has also been stored in the storage portion 10b as history data which was processed and thereby obtained when any one of the DVDs was previously loaded. The judgment portion 10a is adapted to retrieve the previous determination threshold Kthd each time a new DVD is loaded.

After the completion of the initialization, the process starts reading the loaded DVD as well as allows the sensor circuit 8 and the judgment portion 10a to start the wobble detection processing and the determination processing, respectively.

That is, the sensor circuit 8 processes the push-pull signal Spp which occurs through the same processing as that for reading information, and in accordance with the resulting counts Sjd, the judgment portion 10a determines the determination rate K for determining the presence or absence of wobbles.

In step S108, the judgment portion 10a then compares the determination rate K with the determination threshold Kthd, thereby determining whether or not wobbles are present. If it has been judged that a non-wobbled DVD has been loaded (if YES), the process proceeds to step S110.

Then, in step S110, under the control of the system controller 10, the process searches the control data zone located after the sector number "2F200" shown in FIG. 10, to read information thereon, and then captures the control data SCNT delivered by the signal processing circuit 6. Subsequently, in step S112, the process determines whether control data of a book type has been obtained.

That is, in step S108, the process determines for the time being that a DVD-ROM or a non-wobbled DVD has been loaded. In step S110, the process then searches the control data zone after sector number "2F200" to read the information stored thereon as control data SCNT. In step S112, it is checked whether the control data SCNT is control data indicative of the book type of the DVD-ROM, thereby further determining whether the aforementioned determination result that "there is no wobble" is correct.

Then, in step S112, if the process determines that the control data indicative of the book type of the DVD-ROM has been read (if YES), the process proceeds to step S124. If not true (if NO), the process proceeds to step S116.

In step S116, it is confirmed that the determination result that "there is no wobble" is in error. The detection sensitivity control portion 8f is informed of this, and then the process proceeds to step S118 to step S120. That is, since the disk is not a DVD-ROM irrespective of the determination that "there is no wobble", the process determines that the value of the determination threshold Kthd which is set for the determination of wobbles is not appropriate, and then the process proceeds to step S118 to step S120.

In step S118, the process retrieves the characteristic data A of the DvD-ROM which is stored in the storage portion 10b, so as to find the determination rate (hereinafter referred to as the reference determination rate) Kmax, at which the incidence of the characteristic data A is at a minimum. That is, determined is the reference determination rate Kmax which is indicative of the end of the margin range WM shown in FIG. 7. Then, it is checked whether the reference determination rate Kmax multiplied by the prescribed margin factor M or M×Kmax is less than the actual determination rate K which has been determined in the aforementioned step S106.

In the foregoing, the margin factor M determines up to how many times the upper limit range should be greater than the reference determination rate Kmax to be employed as an appropriate margin range WM. In other words, with the reference determination rate Kmax shown in FIG. 7 being employed as the edge of the margin range WM, the margin factor M determines up to which position near the characteristic data B of the DVD-RW the upper limit of the margin range WM would be to provide an appropriate margin range WM.

For example, this margin factor M is a prescribed appropriate integer such as 5, 6, 7, and so forth, and the range of determination rates in which both the characteristic data A, B have the minimum incidence is empirically determined in advance. The margin factor M is determined in advance so as to be optimized such that the margin factor M is set to a larger value for a broader margin range WM, while the margin factor M is set to a smaller value for a smaller margin range WM.

Then, if K≦M×Kmax (if NO), the process determines that the current margin range WM is sufficiently enough for the actually obtained determination rate K. The process then proceeds to step S122 to finish the determination processing without changing the determination threshold Kthd.

In the aforementioned step S118, if K>M×Kmax (if YES), the process proceeds to step S120 to change (update) the determination threshold Kthd. That is, the actually obtained determination rate K is subtracted by a prescribed factor β to yield a new determination threshold Kthd. As shown in FIG. 9, this causes the new determination threshold Kthd to move further into the margin range WM, thereby making it possible to improve the accuracy of determining the presence or absence of wobbles.

Subsequently, after the determination threshold Kthd has been updated, the process proceeds to step S122 to finish the series of processing.

Now, suppose that it is determined to be YES in the aforementioned step S112 and then the process proceeds to step S124, that is, the process determines that the control data indicative of the book type of the DVD-ROM has been read, and then proceeds to step S124. In this case, a comparison is made between the actually obtained determination rate K and the current reference determination rate Kmax. If K≦Kmax (if NO), the process determines that the reference determination rate Kmax does not need to be updated and then proceeds to step S122, where the process starts the processing such as reading information on the DVD-ROM after having completed the series of determination processing.

On the other hand, in step S124, if K>Kmax (if YES), the value of the reference determination rate Kmax of the DVD-ROM is replaced with the value of the actually obtained determination rate K (or thereby updated) in step S126. Incidentally, with the reference determination rate Kmax having been updated, the updated reference determination rate Kmax is used for the determination processing in steps S118 and S124 upon loading a subsequent DVD. That is, the reference determination rate Kmax is also stored as history data in the storage portion 10b and used for the subsequent determination processing, thereby making it possible to further optimize the determination threshold Kthd.

Then, in step S128, the aforementioned prescribed margin factor M is multiplied by the updated reference determination rate Kmax to obtain a value M×Kmax which is then compared with the current determination threshold Kthd. If M×Kmax≦Kthd (if NO), the process determines that the determination threshold Kthd does not need to be updated and then proceeds to step S122, where the process starts the processing such as reading information on the DVD-ROM after having completed the series of determination processing.

On the other hand, if M×Kmax>Kthd (if YES), the process proceeds to step S130 to change (update) the determination threshold Kthd. That is, the margin factor M is multiplied by the updated reference determination rate Kmax to obtain the value M×Kmax which is then updated as a new determination threshold Kthd. Then, the process proceeds to step S122 to start the processing such as reading information on the DVD-ROM after having completed the series of determination processing.

Now, explained below is the operation for the case where it has been determined in the aforementioned step S108 that "there is a wobble". The determination that "there is a wobble" causes the process to proceed to step S132 in order to read the information stored after sector number "2E400". That is, the determination that "there is a wobble" causes the process to determine for the time being that the loaded DVD is a DVD-RW. Then, the process performs the processing for reading a book type of control data which is stored in the RW-physical format information area of the DVD-RW shown in FIG. 10. Then, the process acquires the control data SCNT delivered from the signal processing circuit 6 as the read information.

Then, in step S134, the process determines whether the control data SCNT is a book type of control data of the DVD-RW. If true (if YES), the process determines that the determination that "there is a wobble" is correct. Then, the process proceeds to step S122 to start the processing such as reading or writing information on the DVD-RW after having completed the series of determination processing.

Suppose that the process has failed to read the book type of control data of the DVD-RW, and continues to read further the data stored after sector number "2F200" (step S136) but fails to read a book type of control data of the DVD-R (step S138). This provides a final determination result telling that the disk is neither a DVD-RW nor a DVD-R irrespective of the determination that "there is a wobble". Accordingly, the process determines that there is something wrong with the loaded DVD, and then performs error processing (step S140). For example, the process determines that the information stored on the DVD has been illegally copied, and then forcefully ejects the DVD. Then, the process proceeds to step S122 to exit the series of determination processing.

As described above, the information read and/or write apparatus 1 according to this embodiment is adapted such that the sensor circuit 8 optimizes the detection sensitivity for detecting the information regarding wobbles contained in the push-pull signal Spp. Furthermore, to distinguish between a wobbled DVD and a non-wobbled DVD, the judgment portion 10a compares the determination rate K with the determination threshold Kthd as well as adjusting the determination threshold Kthd for use with the determination to an appropriate value. This makes it possible to distinguish between a wobbled DVD and a non-wobbled DVD with high accuracy.

Incidentally, upon adjusting the aforementioned detection sensitivity, it may also be acceptable to adjust as appropriate the pass band frequency of the band-pass filter 8a and the threshold voltage THD of the comparator 8b.

In addition, in the aforementioned embodiment, the sensor circuit 8 optimizes the detection sensitivity, and the judgment portion 10a adjusts the determination threshold Kthd to an appropriate value. However, as a modified example, it may also be acceptable that only either the detection sensitivity or the determination threshold Kthd is adjusted.

Figure 12:
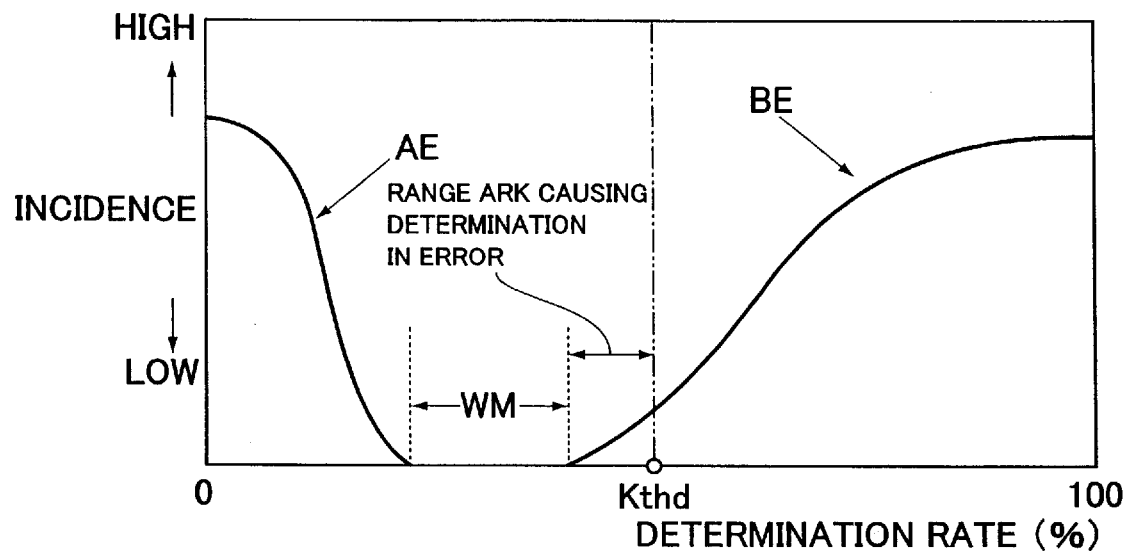
FIGS. 12(a) and 12(b) are explanatory views illustrating another method for improving the accuracy of wobble determination.
Figure 12:
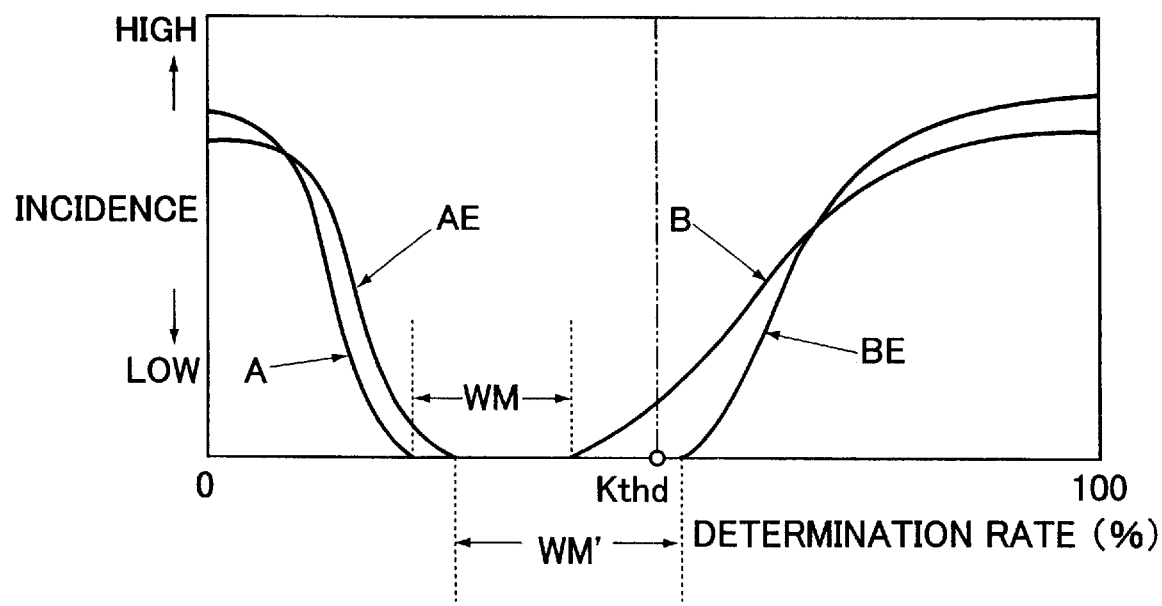

Suppose that the determination threshold Kthd is fixed to the factory default setting which has been set at the time of shipping and only the detection sensitivity is adjusted, when the determination threshold Kthd has the relationship (being likely to cause a determination in error), for example, as shown in FIG. 12(a) with the characteristic data A, B in the factory default setting of the DVD-ROM and DVD-RW, respectively. In this case, as the sensor circuit 8 brings the detection sensitivity closer to the optimum level, the characteristic data A, B vary to expand from the margin range WM to a broader margin range WM', as shown by characteristic data AE, BE indicated with a dotted line in FIG. 12(b). Even with the determination threshold Kthd being fixed to the factory default setting, this allows the determination threshold Kthd to fall within the margin range WM with greater certainty. It is thereby made possible to determine the presence or absence of wobbles with improved accuracy by the comparison in magnitude between the actually obtained determination rate K and the determination threshold Kthd.

Incidentally, the judgment portion 10a does not actually determine the characteristic data AE, BE, and therefore does not perform any processing for analyzing a variation in the characteristic data AE, BE. However, a simulation carried out to find the variation in the characteristic data AE, BE, which is caused by the optimization of the detection sensitivity of the sensor circuit 8, provides the state as shown in FIG. 12(b). From this fact, it can be said that the state is provided which is substantially equivalent to the state in which the characteristic data AE, BE, shown in FIG. 12(b), has been determined. In other words, although the characteristic data AE, BE is not actually determined, it is made possible to determine the presence or absence of wobbles substantially under the environment equivalent to that in which the characteristic data AE, BE has been determined. This makes it possible to improve the accuracy of the determination.

On the other hand, suppose that the determination threshold Kthd is adjusted with the detection sensitivity of the sensor circuit 8 being fixed to the factory default setting. In this case, as shown in FIG. 9, the determination threshold Kthd is brought into the margin range WM with greater certainty; thereby making it possible to improve accuracy of the determination of whether or not wobbles are present.

Therefore, such an arrangement, as is incorporated into the aforementioned embodiment, is acceptable which allows the sensor circuit 8 to optimize the detection sensitivity and the judgment portion 10a to adjust the determination threshold Kthd to an appropriate value, thereby improving the accuracy of the determination of whether a wobble is present. The first modified example may also be accepted which allows the sensor circuit 8 to optimize the detection sensitivity and the judgment portion 10a to fix the determination threshold Kthd. Alternatively, the second modified example may be accepted which allows the sensor circuit 8 to fix the detection sensitivity and the judgment portion 10a to adjust the determination threshold Kthd.

The aforementioned first and second modified examples provide such effects which can simplify the apparatus and alleviate the burden of the system program.

This embodiment and the modified examples are configured such that the sensor circuit 8 and the judgment portion 10*a* are incorporated in advance in the information read and/or write apparatus 1, however, the present invention is not limited to this configuration. That is, a computer program (or an emulator) may be employed to implement the sensor circuit 8 and the judgment portion 10*a*. The computer program is then installed in the memory which is incorporated in the system controller. A microprocessor in the system controller may be then allowed to execute the computer program while accessing the memory, thereby providing the function equivalent to those of the aforementioned sensor circuit 8 and the judgment portion 10*a*. That is, such an arrangement is acceptable which replaces the function of the sensor circuit 8 and the judgment portion 10*a* with the emulator.

It is also possible to provide users with information storage media such as CDs (Compact Disks) or DVDs on which the aforementioned computer program (or an emulator) is stored as an application program. The application program may be installed or downloaded in user's electronic device such as a personal computer which can read the information storage medium, thereby being allowed to be executed. This makes it possible to use the electronic device such as a personal computer in the same manner that the information read and/or write apparatus 1 is used, thereby providing users with good convenience.

As described above, the present invention is adapted as follows. That is, a light-receiving device receives a light beam reflected on an information read and/or write medium to be determined, and a signal characteristic of a read and/or write surface of the information read and/or write medium is generated in accordance with an output signal delivered by the light-receiving device. The characteristic information regarding the read and/or write surface is detected in accordance with the generated signal, and the detection rate of the characteristic information per a prescribed detection time period is determined. The presence or absence of wobbles on the information read and/or write medium is determined in accordance with the detection rate. When the determination has been provided in error, a detection sensitivity parameter is adjusted. In this case, the parameter is adjusted such that the detection rate can well represent the information regarding the presence or absence of wobbles to determine the presence or absence of wobbles in accordance with the value of the detection rate. This makes it possible to improve the accuracy of determining the presence or absence of wobbles.

The present invention is also adapted as follows. That is, a light-receiving device receives a light beam reflected on an information read and/or write medium to be determined, and a signal characteristic of a read and/or write surface of the information read and/or write medium is generated in accordance with an output signal delivered by the light-receiving device. The characteristic information regarding the read and/or write surface is detected in accordance with the generated signal, and the detection rate of the characteristic information per a prescribed detection time period is determined. Furthermore, a plurality of detection rates are compared with a prescribed threshold to find a determination rate or a ratio of a detection rate count to be compared with to a detection rate count exceeding the threshold. Then, the presence or absence of wobbles on the information read and/or write medium is determined in accordance with a determination of whether the determination rate is greater than a prescribed determination threshold. In addition to this, the determination threshold is adjusted when the determination has been provided in error. This makes it possible to improve the accuracy of determining the presence or absence of wobbles.

The present invention is also adapted as follows. That is, a light-receiving device receives a light beam reflected on an information read and/or write medium to be determined, and a signal characteristic of a read and/or write surface of the information read and/or write medium is generated in accordance with the output signal delivered by the light-receiving device. The characteristic information regarding the read and/or write surface is detected in accordance with the generated signal, and the detection rate of the characteristic information per a prescribed detection time period is determined. Then, the presence or absence of wobbles is determined in accordance with the detection rate. When the determination has been provided in error, a detection sensitivity parameter is adjusted. In this case, the parameter is adjusted such that the detection rate can well represent the information regarding the presence or absence of wobbles. This makes it possible to improve the accuracy of determining the presence or absence of wobbles when the presence or absence of wobbles is determined in accordance with the value of the detection rate. Furthermore, a plurality of detection rates are compared with a prescribed threshold to find a determination rate or a ratio of a detection rate count to be compared with to a detection rate count exceeding the threshold. When the determination rate is greater than the prescribed determination threshold, it is determined that the information read and/or write medium is wobbled. On the other hand, when the determination rate is less than the prescribed determination threshold, the determination threshold is adjusted. This makes it possible to improve the accuracy of determining the presence or absence of wobbles.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An information read and/or write apparatus having a function for distinguishing between an information read and/or write medium having a wobbled track and an information read and/or write medium having a non-wobbled track, comprising:

a light-receiving device for receiving a light beam reflected on said information read and/or write medium, signal generator device for generating a signal characteristic of a read and/or write surface of said information read and/or write medium in accordance with an output signal delivered by said light-receiving device, sensor device for detecting the characteristic information of said read and/or write surface in accordance with the signal delivered by said signal generator device and for determining a detection rate of the characteristic information per a prescribed detection time period, determination device for determining presence or absence of said wobbled track on said information read and/or write medium in accordance with said detection rate, and control device for controlling detection sensitivity to detect said characteristic information by adjusting a detection sensitivity parameter when said determination device has provided a determination in error.

2. An information read and/or write apparatus having a function for distinguishing between an information read and/or write medium having a wobbled track and an information read and/or write medium having a non-wobbled track, comprising:
- a light-receiving device for receiving a light beam reflected on said information read and/or write medium,
- signal generator device for generating a signal characteristic of a read and/or write surface of said information read and/or write medium in accordance with an output signal delivered by said light-receiving device,
- sensor device for detecting the characteristic information of said read and/or write surface in accordance with the signal delivered by said signal generator device and for determining a detection rate of the characteristic information per a prescribed detection time period, and
- determination device for comparing a plurality of detection rates determined by said sensor device with a prescribed threshold to find a determination rate or a ratio of a detection rate count exceeding said threshold to a detection rate count to be compared with and then determine the presence or absence of said wobbled track on the information read and/or write medium in accordance with a determination of whether said determination rate is greater than the prescribed determination threshold, and for adjusting said determination threshold when said determination device has provided a determination in error, wherein
  said determination threshold is set at a value for distinguishing between said information read and/or write medium having said wobbled track and said information read and/or write medium having said non-wobbled track.

3. An information read and/or write apparatus having a function for distinguishing between an information read and/or write medium having a wobbled track and an information read and/or write medium having a non-wobbled track, comprising:
- a light-receiving device for receiving a light beam reflected on said information read and/or write medium,
- signal generator device for generating a signal characteristic of a read and/or write surface of said information read and/or write medium in accordance with an output signal delivered by said light-receiving device,
- sensor device for detecting the characteristic information of said read and/or write surface in accordance with the signal delivered by said signal generator device and for determining a detection rate of the characteristic information per a prescribed detection time period,
- determination device for determining presence or absence of wobbles on said information read and/or write medium in accordance with said detection rate,
- control device for controlling detection sensitivity to detect said characteristic information by adjusting a detection sensitivity parameter when said determination device has provided a determination in error, and
- determination device for comparing a plurality of detection rates determined by said sensor device with a prescribed threshold to find a determination rate or a ratio of a detection rate count exceeding said threshold to a detection rate count to be compared with and then determine that the information read and/or write medium has said wobbled track when said determination rate is greater than the prescribed determination threshold.

4. An information read and/or write method for distinguishing between an information read and/or write medium having a wobbled track and an information read and/or write medium having a non-wobbled track, comprising the steps of:
- generating a signal characteristic of a read and/or write surface of said information read and/or write medium in accordance with a light beam reflected on said information read and/or write medium,
- detecting the characteristic information of said read and/or write surface in accordance with the generated signal to determine a detection rate of the characteristic information per a prescribed detection time period,
- determining presence or absence of said wobbled track on said information read and/or write medium in accordance with said detection rate, and
- controlling detection sensitivity to detect said characteristic information by adjusting a detection sensitivity parameter when a determination has been provided in error in said step of determining the presence or absence of said wobbled track.

5. An information read and/or write method for distinguishing between an information read and/or write medium having a wobbled track and an information read and/or write medium having a non-wobbled track, comprising the steps of:
- generating a signal characteristic of a read and/or write surface of said information read and/or write medium in accordance with a light beam reflected on said information read and/or write medium,
- detecting the characteristic information of said read and/or write surface in accordance with the generated signal to determine a detection rate of the characteristic information per a prescribed detection time period, and
- comparing said plurality of detection rates with a prescribed threshold to find a determination rate or a ratio of a detection rate count exceeding said threshold to a detection rate count to be compared with and then determine the presence or absence of said wobbled track on the information read and/or write medium in accordance with a determination of whether said determination rate is greater than a prescribed determination threshold, and adjust said determination threshold when said determination has been provided in error, wherein
  said determination threshold is set at a value for distinguishing between said information read and/or write medium having said wobbled track and said information read and/or write medium having said non-wobbled track.

6. An information read and/or write method for distinguishing between an information read and/or write medium having a wobbled track and an information read and/or write medium having a non-wobbled track, comprising the steps of:
- generating a signal characteristic of a read and/or write surface of said information read and/or write medium in accordance with a light beam reflected on said information read and/or write medium,
- detecting the characteristic information of said read and/or write surface in accordance with the generated signal to determine a detection rate of the characteristic information per a prescribed detection time period,
- determining presence or absence of said wobbled track on said information read and/or write medium in accordance with said detection rate, controlling detection sensitivity to detect said characteristic information by adjusting a detection sensitivity parameter when a determination has been provided in error in said step of determining the presence or absence of said wobbled track, and comparing said plurality of detection rates with a prescribed threshold to find a determination rate or a ratio of a detection rate count exceeding said threshold to a detection rate count to be compared with and then determine that the information read and/or write medium has said wobbled track when said determination rate is greater than the prescribed determination threshold.

7. A computer data signal embodied in a carrier wave and representing a series of instructions which cause a computer to perform steps to distinguish between an information read and/or write medium having a wobbled track and an information read and/or write medium having a non-wobbled track, said program information comprising the steps of:

generating a signal characteristic of a read and/or write surface in accordance with a light beam reflected on said information read and/or write medium to be determined, detecting the characteristic information of said read and/or write surface in accordance with the generated signal to determine a detection rate of the characteristic information per a prescribed detection time period, determining presence or absence of said wobbled track on said information read and/or write medium in accordance with said detection rate, and controlling detection sensitivity to detect said characteristic information by adjusting a detection sensitivity parameter when a determination has been provided in error in said step of determining the presence or absence of said wobbled track.

8. A computer data signal embodied in a carrier wave and representing a series of instructions which cause a computer to perform steps to distinguish between an information read and/or write medium having a wobbled track and an information read and/or write medium having a non-wobbled track, said program information comprising the steps of:

generating a signal characteristic of a read and/or write surface of said information read and/or write medium in accordance with a light beam reflected on said information read and/or write medium to be determined, detecting the characteristic information of said read and/or write surface in accordance with the generated signal to determine a detection rate of the characteristic information per a prescribed detection time period, and comparing said plurality of detection rates with a prescribed threshold to find a determination rate or a ratio of a detection rate count exceeding said threshold to a detection rate count to be compared with and then determine the presence or absence of said wobbled track on the information read and/or write medium in accordance with a determination of whether said determination rate is greater than a prescribed determination threshold, and adjust said determination threshold when said determination has been provided in error, wherein said determination threshold is set at a value for distinguishing between said information read and/or write medium having said wobbled track and said information read and/or write medium having said non-wobbled track.

9. A computer data signal embodied in a carrier wave and representing a series of instructions which cause a computer to perform steps to distinguish between an information read and/or write medium having a wobbled track and an information read and/or write medium having a non-wobbled track, said program information comprising the steps of:

generating a signal characteristic of a read and/or write surface of a information read and/or write medium of said information read and/or write medium in accordance with a light beam reflected on said information read and/or write medium to be determined, detecting the characteristic information of said read and/or write surface in accordance with the generated signal to determine a detection rate of the characteristic information per a prescribed detection time period, determining presence or absence of said wobbled track on said information read and/or write medium in accordance with said detection rate, controlling detection sensitivity to detect said characteristic information by adjusting a detection sensitivity parameter when a determination has been provided in error in said step of determining the presence or absence of said wobbled track, and comparing said plurality of detection rates with a prescribed threshold to find a determination rate or a ratio of a detection rate count exceeding said threshold to a detection rate count to be compared with and then determine that the information read and/or write medium has said wobbled track when said determination rate is greater than the prescribed determination threshold.

* * * * *